(12) United States Patent
Cao et al.

(10) Patent No.: US 12,122,894 B2
(45) Date of Patent: Oct. 22, 2024

(54) USE OF RARE EARTH AMINO ACID COMPLEX, POLYLACTIC ACID COMPOSITION AND PREPARATION METHOD THEREOF

(71) Applicant: Baotou Research Institute of Rare Earths, Baotou (CN)

(72) Inventors: Luya Cao, Baotou (CN); Hongzhang Cao, Baotou (CN); Dequan Han, Baotou (CN); Hui Wang, Baotou (CN); Huhu Tian, Baotou (CN); Xiaoli Yu, Baotou (CN); Tingting Lu, Baotou (CN); Xiaodong Zhou, Baotou (CN); Liying Guo, Baotou (CN)

(73) Assignee: Baotou Research Institute of Rare Earths, Baotou (CN)

( * ) Notice: Subject to any disclaimer, the term of this patent is extended or adjusted under 35 U.S.C. 154(b) by 0 days.

(21) Appl. No.: 18/215,680

(22) Filed: Jun. 28, 2023

(65) Prior Publication Data

US 2024/0084099 A1 Mar. 14, 2024

(30) Foreign Application Priority Data

Sep. 14, 2022 (CN) .......................... 202211113125.6

(51) Int. Cl.
*C08K 5/00* (2006.01)
*C08J 3/20* (2006.01)
*C08L 67/04* (2006.01)

(52) U.S. Cl.
CPC .............. *C08K 5/0091* (2013.01); *C08J 3/203* (2013.01); *C08L 67/04* (2013.01); *C08J 2367/04* (2013.01); *C08J 2491/00* (2013.01); *C08L 2207/322* (2013.01)

(58) Field of Classification Search
CPC ..... C08K 5/0091; C08J 3/203; C08J 2367/04; C08J 2491/00; C08L 67/04; C08L 2207/322
See application file for complete search history.

(56) References Cited

FOREIGN PATENT DOCUMENTS

| CN | 108586896 A | 9/2018 |
|---|---|---|
| CN | 109320850 A | 2/2019 |
| CN | 111484650 A | 8/2020 |
| CN | 114058076 A | 2/2022 |

OTHER PUBLICATIONS

Xu Yongning et al.; "Plastics Thermoplastic materials—Determination of Vicat softening temperature (VST)"; c. 1979.
First Office Action issued Jun. 8, 2023 in corresponding Chinese Application No. 202211113125.6.

*Primary Examiner* — Angela C Scott
(74) *Attorney, Agent, or Firm* — Global IP Counselors, LLP

(57) ABSTRACT

Provided are use of a rare earth amino acid complex, a polylactic acid composition and a preparation method thereof. The rare earth amino acid complex is formed by complexing a rare earth metal ion with an amino acid; a rare earth element corresponding to the rare earth metal ion is one or more selected from the group consisting of lanthanum, cerium and samarium; and the amino acid is at least one selected from the group consisting of proline, L-phenylalanine, tyrosine and tryptophan.

12 Claims, No Drawings

USE OF RARE EARTH AMINO ACID COMPLEX, POLYLACTIC ACID COMPOSITION AND PREPARATION METHOD THEREOF

CROSS-REFERENCE TO RELATED APPLICATION

This patent application claims the benefit and priority of Chinese Patent Application No. 2022111131256 filed with the China National Intellectual Property Administration on Sep. 14, 2022, the disclosure of which is incorporated by reference herein in its entirety as part of the present application.

BACKGROUND

Technical Field

The present disclosure relates to use of a rare earth amino acid complex, a polylactic acid composition and a preparation method thereof.

Background Information

Polylactic acid has been widely studied due to biodegradability and biocompatibility thereof. Polylactic acid has similar mechanical properties to engineering plastics. With the deepening of research, the production cost of polylactic acid is gradually decreasing. Therefore, polylactic acid has become the most potential biomaterial to replace conventional petroleum-based polymers. However, compared with conventional plastics, the thermal deformation resistance and Vicat softening temperature of the polylactic acid still need to be improved.

At present, the performance of polylactic acid is mainly improved by adding nucleating agents. A plurality of polylactic acid nucleating agents have been developed. For example, Chinese patent CN111484650A discloses a composite nucleating agent for polylactic acid containing rare earth aryl phosphate, including the following components: rare earth aryl phosphate, an antioxidant and a plasticizer. Chinese patent CN114058076A discloses a lactic acid-rare earth complex as a nucleating agent for polylactic acid.

Rare earth amino acids can be used to improve the properties of polyolefins. For example, Chinese patent CN108586896A discloses a maleic anhydride modified rare earth amino acid nucleating agent for improving the performance of polyethylene. As another example, Chinese patent CN109320850A discloses an amino acid rare earth salt nucleating agent for improving the properties of polypropylene, ethylene-octene block copolymer, and the like. However, since the chemical structures of polylactic acid and polyolefins are greatly different, nucleating agents that can be used for polyolefins are not necessarily suitable for polylactic acid. Therefore, so far, there have been no reports on using rare earth amino acid complexes as nucleating agents to improve the performance of polylactic acid.

SUMMARY

In view of the above, an object of the present disclosure is to provide use of a rare earth amino acid complex in improving a softening temperature of polylactic acid. Another object of the present disclosure is to provide a polylactic acid composition, including the rare earth amino acid complex and polylactic acid. A still further object of the present disclosure is to provide a preparation method of the polylactic acid composition. The present disclosure adopts the following technical solutions to achieve the foregoing objects.

In one aspect, the present disclosure provides use of a rare earth amino acid complex in improving a softening temperature of polylactic acid, wherein the rare earth amino acid complex is formed by complexing a rare earth metal ion with an amino acid; a rare earth element corresponding to the rare earth metal ion is one or more selected from the group consisting of lanthanum, cerium and samarium; and the amino acid is at least one selected from the group consisting of proline, L-phenylalanine, tyrosine and tryptophan.

In some embodiments, the use of the present disclosure includes the following steps:
  reacting a rare earth isopropoxide with the amino acid in a molar ratio of 1:(3.5-4.0) in a solvent including an aromatic compound and isopropanol at a temperature of 70-90° C. for 1-2 h, to obtain the rare earth amino acid complex, and
  mixing raw materials including polylactic acid, the rare earth amino acid complex and an additive by a twin-screw extruder at a temperature of 170-190° C. for 5-15 min to obtain the polylactic acid composition.

In some embodiments, the use of the present disclosure further includes the following steps:
  reacting a rare earth carbonate with trichloroacetic acid (TCA) in a molar ratio of (1.05-1.2):1 at a temperature of 0-15° C. to obtain a rare earth trichloroacetate, and
  reacting the rare earth trichloroacetate with isopropanol in a molar ratio of 1:(3-3.5) to obtain the rare earth isopropoxide.

In some embodiments of the use of the present disclosure, the rare earth trichloroacetate and isopropanol are reacted in the presence of an alkali metal to obtain the rare earth isopropoxide.

In some embodiments of the use of the present disclosure, a molar ratio of isopropanol to the alkali metal is in a range of 1:(1-1.1).

In some embodiments of the use of the present disclosure, the alkali metal is sodium.

In some embodiments of the use of the present disclosure, the aromatic compound is one selected from the group consisting of benzene and alkylbenzene.

In another aspect, the present disclosure further provides a polylactic acid composition, including:
  100 parts by weight of polylactic acid,
  0.5-2.0 parts by weight of a rare earth amino acid complex, and
  0.5-2.0 parts by weight of an additive;
  wherein, the rare earth amino acid complex is formed by complexing a rare earth metal ion with an amino acid; a rare earth element corresponding to the rare earth metal ion is one or more selected from the group consisting of lanthanum, cerium and samarium; and the amino acid is at least one selected from the group consisting of proline, L-phenylalanine, tyrosine and tryptophan; and
  the additive is one or more selected from the group consisting of soybean oil, epoxidized soybean oil, tributyl citrate and acetyl tributyl citrate.

In some embodiments of the composition of the present disclosure, the polylactic acid composition has a Vicat softening temperature greater than 93° C.

In yet another aspect, the present disclosure further provides a method for preparing the foregoing composition, including the following steps:

mixing raw materials including polylactic acid, the rare earth amino acid complex and the additive by a twin-screw extruder at a temperature of 170-190° C. for 5-15 min to obtain the polylactic acid composition.

In the present disclosure, the rare earth amino acid complex is used as a nucleating agent, which allows improving the Vicat softening temperature of the polylactic acid composition.

DETAILED DESCRIPTION OF THE EMBODIMENTS

The present disclosure will be further described below in conjunction with specific embodiments, but the protection scope of the present disclosure is not limited thereto.

Use of Rare Earth Amino Acid Complex

A rare earth amino acid complex provided by the present disclosure can improve a softening temperature of polylactic acid. In some embodiments, the softening temperature is Vicat softening temperature. Higher Vicat softening temperature indicates better heat resistance. In the present disclosure, the rare earth amino acid complex is formed by complexing a rare earth metal ion and an amino acid.

In the present disclosure, a rare earth element corresponding to the rare earth metal ion is one or more selected from the group consisting of lanthanum, cerium and samarium, preferably one selected from the group consisting of lanthanum, cerium and samarium, and more preferably one selected from the group consisting of lanthanum and cerium. The amino acid is at least one selected from the group consisting of proline, L-phenylalanine, tyrosine and tryptophan, preferably one selected from the group consisting of proline, L-phenylalanine and tyrosine, and more preferably L-phenylalanine. Such rare earth amino acid complex is more conducive to improving the Vicat softening temperature of polylactic acid.

According to a specific embodiment of the present disclosure, the rare earth amino acid complex is a cerium L-phenylalanine complex. According to another specific embodiment of the present disclosure, the rare earth amino acid complex is a lanthanum L-phenylalanine complex.

In some embodiments, the use of the rare earth amino acid complex provided by the present disclosure includes the following steps: a preparation of a rare earth trichloroacetate; a preparation of a rare earth isopropoxide; a preparation of the rare earth amino acid complex; and a preparation of a polylactic acid composition. A detailed description is given below.

The Preparation of the Rare Earth Trichloroacetate

A rare earth carbonate is reacted with TCA to obtain the rare earth trichloroacetate. In some embodiments, the rare earth carbonate is at least one selected from the group consisting of cerium carbonate, lanthanum carbonate and samarium carbonate. In some embodiments, a molar ratio of the rare earth carbonate to TCA is in a range of (1.05-1.2):1, preferably (1.05-1.15):1, and more preferably (1.05-1.1):1. In some embodiments, the rare earth carbonate is reacted with TCA at a reaction temperature of 0-15° C., preferably 0-10° C., and more preferably 0-5° C. In some embodiments, the rare earth carbonate is reacted with TCA for a reaction time of 1-2.5 h, preferably 1-2 h, and more preferably 1-1.5 h.

In some embodiments, TCA can be prepared as a 30-55 wt % solution (water as a solvent) first, and then reacted with the rare earth carbonate. In some embodiments, a mass ratio of TCA to water is 1:1.

According to a specific embodiment of the present disclosure, the rare earth carbonate is added to a 50 wt % TCA aqueous solution and subjected to reaction at 0-15° C. for 1-2 h.

In some embodiments, after the reaction is completed, a first reaction mixture is filtered to obtain a filtrate. A filter cake obtained by filtration is mainly the rare earth carbonate. In some embodiments, the filtrate is dried in a desiccator to obtain a rare earth trichloroacetate hydrate. In some embodiments, a desiccant in the desiccator is one or more selected from the group consisting of solid sodium hydroxide, calcium oxide and phosphorus pentoxide, and preferably one selected from the group consisting of the sodium hydroxide and the phosphorus pentoxide. In some embodiments, the desiccator has a vacuum degree of $1.0 \times 10^2$ to $8.0 \times 10^2$ Pa.

The Preparation of the Rare Earth Isopropoxide

The rare earth trichloroacetate and isopropanol are reacted to obtain the rare earth isopropoxide. In some embodiments, the rare earth trichloroacetate and isopropanol are reacted in the presence of an alkali metal to obtain the rare earth isopropoxide. In some embodiments, the alkali metal is one selected from the group consisting of sodium and potassium, and preferably sodium.

In some embodiments, a molar ratio of the rare earth trichloroacetate to isopropanol is in a range of 1:(3-3.5), preferably 1:(3-3.2), and more preferably 1:(3.03-3.05). In some embodiments, a molar ratio of isopropanol to the alkali metal is in a range of 1:(1-1.1), preferably 1:(1-1.05), and more preferably 1:(1.01-1.03). In some embodiments, the rare earth trichloroacetate and isopropanol are reacted at a temperature of 100-120° C., preferably 105-115° C., and more preferably 110-115° C. In some embodiments, the rare earth trichloroacetate and isopropanol are reacted for a reaction time of 2-4 h, preferably 2-3.5 h, and more preferably 2-3 h. In some embodiments, after the reaction, a second reaction mixture is subjected to filtration. In some embodiments, during the filtration, the second reaction mixture is held at a temperature of 100-120° C.

In some embodiments, a solvent used in this step is an aromatic compound, and the aromatic compound is one selected from the group consisting of benzene and alkylbenzene. In some embodiments, the alkylbenzene is one selected from the group consisting of toluene and ethylbenzene, and preferably toluene. In some embodiments, a ratio of the solvent to the rare earth trichloroacetate is in a range of (20-60 mL):0.1 mol, and preferably (30-50 mL):0.1 mol.

According to an embodiment of the present disclosure, the rare earth trichloroacetate, isopropanol and toluene are mixed, and then added with diced metal sodium, and subjected to reaction at 110-115° C. for 2-3 h to obtain the second reaction mixture, and the second reaction mixture is filtered to obtain a rare earth isopropoxide solution; wherein, a molar ratio of the rare earth trichloroacetate to isopropanol is in a range of 1:(3-3.5); and a molar ratio of isopropanol to the alkali metal is in a range of 1:(1-1.1).

In some embodiments, the rare earth isopropoxide solution is directly used for the next reaction.

The Preparation of the Rare Earth Amino Acid Complex

The rare earth isopropoxide is reacted with the amino acid in a solvent comprising an aromatic compound and isopropanol to obtain the rare earth amino acid complex. In some embodiments, the solvent consists of the aromatic compound and isopropanol. In some embodiments, the aromatic compound can be one selected from the group consisting of benzene and alkylbenzene. In some embodiments, the alkylbenzene can be one selected from the group consisting of toluene and ethylbenzene, and preferably toluene. In the present disclosure, the rare earth isopropoxide can be reacted with the amino acid by using the rare earth isopropoxide solution obtained above. Therefore, the solvent used can consist of a solvent in the rare earth isopropoxide solution obtained above and unreacted isopropanol.

In some embodiments, the amino acid is at least one from the group consisting of proline, L-phenylalanine, tyrosine and tryptophan. In some embodiments, a molar ratio of the rare earth isopropoxide to the amino acid is in a range of 1:(3.5-4.0), preferably 1:(3.5-3.8), and more preferably 1:(3.6-3.8). In some embodiments, the rare earth isopropoxide is reacted with the amino acid at a temperature of 70-90° C., preferably 75-90° C., and more preferably 80-85° C. In some embodiments, the rare earth isopropoxide is reacted with the amino acid for a reaction time of 1-2.5 h, preferably 1.5-2.5 h, and more preferably 2-2.5 h. After the reaction is completed, a third reaction mixture is subjected to solid-liquid separation to obtain a solid, and the solid is subjected to drying, to obtain the rare earth amino acid complex. In some embodiments, the solid-liquid separation is performed by filtration. In some embodiments, the drying is performed by vacuum drying, and the vacuum drying can be conducted at a temperature of 45-65° C., and preferably 50-60° C.

According to a specific embodiment of the present disclosure, the amino acid is added to the rare earth isopropoxide solution obtained above, and reacted at 70-90° C. for 1-2.5 h to obtain the third reaction mixture, and after reaction, the third reaction mixture is filtered to obtain a solid, and the solid is dried to obtain the rare earth amino acid complex. By such embodiment, the purity of the rare earth amino acid complex obtained is improved, which is beneficial to improve a Vicat softening temperature of polylactic acid.

The Preparation of the Polylactic Acid Composition

Raw materials including polylactic acid, the rare earth amino acid complex and an additive are mixed to obtain the polylactic acid composition. Specifically, the raw materials including polylactic acid, the rare earth amino acid complex and the additive are mixed by a twin-screw extruder at 170-190° C. for 5-15 min to obtain the polylactic acid composition. According to a specific embodiment of the present disclosure, polylactic acid, the rare earth amino acid complex and the additive are mixed in the twin-screw extruder at 170-190° C. for 5-15 min to obtain the polylactic acid composition.

In some embodiments, the additive is one or more selected from the group consisting of soybean oil, epoxidized soybean oil, tributyl citrate and acetyl tributyl citrate. In some embodiments, based on 100 parts by weight of polylactic acid, the rare earth amino acid complex can be used in an amount of 0.5-2.0 parts by weight, and the additive can be used in an amount of 0.5-2.0 parts by weight.

Polylactic Acid Composition

The present disclosure further provides a polylactic acid composition, including:

100 parts by weight of polylactic acid,
0.5-2.0 parts by weight of a rare earth amino acid complex, and
0.5-2.0 parts by weight of an additive.

The rare earth amino acid complex provided by the present disclosure is formed by complexing a rare earth metal ion and an amino acid. In the present disclosure, a rare earth element corresponding to the rare earth metal ion is one or more selected from the group consisting of lanthanum, cerium and samarium, preferably one selected from the group consisting of the lanthanum, the cerium and the samarium, and more preferably one selected from the group consisting of the lanthanum and the cerium. In the present disclosure, the amino acid is at least one selected from the group consisting of proline, L-phenylalanine, tyrosine and tryptophan, preferably one selected from the group consisting of proline, L-phenylalanine and tyrosine, and more preferably L-phenylalanine. Such rare earth amino acid complex is more conducive to improving the Vicat softening temperature of polylactic acid.

According to a specific embodiment of the present disclosure, the rare earth amino acid complex is a cerium L-phenylalanine complex. According to another specific embodiment of the present disclosure, the rare earth amino acid complex is a lanthanum L-phenylalanine complex.

In some embodiments, the additive is one selected from the group consisting of soybean oil, epoxidized soybean oil, tributyl citrate and acetyl tributyl citrate, and more preferably the epoxidized soybean oil.

In some embodiments, based on 100 parts by weight of polylactic acid, the rare earth amino acid complex is used in an amount of 0.7-2.0 parts by weight, and more preferably 1.0-1.5 parts by weight. In some embodiments, based on 100 parts by weight of polylactic acid, the additive is used in an amount of 0.7-1.5 parts by weight, and more preferably 0.8-1.2 parts by weight.

The polylactic acid composition obtained has a Vicat softening temperature greater than 93° C., preferably greater than 105° C., and more preferably greater than 110° C.

Method for Preparing Polylactic Acid Composition

The method for preparing the polylactic acid composition provided by the present disclosure includes the following steps: a preparation of a rare earth trichloroacetate; a preparation of a rare earth isopropoxide; a preparation of a rare earth amino acid complex; and a preparation of the polylactic acid composition. The specific process is as described above, and will not be repeated herein.

In some embodiments, raw materials including polylactic acid, the rare earth amino acid complex and an additive are mixed to obtain the polylactic acid composition. Specifically, the raw materials including polylactic acid, the rare earth amino acid complex and the additive are mixed by a twin-screw extruder at 170-190° C. for 5-15 min to obtain the polylactic acid composition. According to a specific embodiment of the present disclosure, polylactic acid, the rare earth amino acid complex and the additive are mixed in the twin-screw extruder at 170-190° C. for 5-15 min to obtain the polylactic acid composition.

Test Method

Vicat softening temperature test: on a Vicat tester, a Vicat softening temperature of a composition sample is determined in accordance with GB/T1633-2000, with an applied stress of 10 N and a heating rate of 50° C./h.

Raw materials of the following examples and comparative examples are described as follows:

Polylactic acid: Total Corbion Luminy PLA L175.

Preparation Example 1

Under ice-bath conditions, cerium carbonate was added into a 50 wt % TCA aqueous solution, and subjected to reaction for 1.5 h. After the reaction, the resulting reaction mixture was filtered to obtain a filtrate. A molar ratio of cerium carbonate to TCA was 1.05:1. The filtrate was placed in a desiccator and dried with phosphorus pentoxide as a desiccant under a vacuum degree of $6.67 \times 10^2$ Pa for 12 h to obtain cerium trichloroacetate hydrate.

0.1 mol of cerium trichloroacetate hydrate, 0.31 mol of isopropanol and 50 mL of toluene were mixed, added with 7.25 g of diced sodium, and then heated under reflux at 110° C. for 2 h. The resulting reaction mixture was filtered to obtain a cerium (IV) isopropoxide solution.

The cerium (IV) isopropoxide solution was added with 57.19 g of L-phenylalanine, and then heated under reflux at 80° C. for 2 h. After the reaction was completed, the resulting reaction mixture was filtered to obtain a precipitate. The precipitate was vacuum-dried at 50° C. for 24 h to obtain cerium L-phenylalanine complex.

Example 1

A polylactic acid composition consisted of the following components: 100 g of polylactic acid, 0.5 g of cerium L-phenylalanine prepared according to Preparation Example 1, and 0.8 g of epoxidized soybean oil.

Polylactic acid, cerium L-phenylalanine, and epoxidized soybean oil were mixed by a twin-screw extruder at 180° C. for 5 min to obtain the polylactic acid composition. A bar test specimen of the polylactic acid composition was obtained by injection molding and subjected to performance testing.

Preparation Example 2

Under ice-bath conditions, lanthanum carbonate was added into a 50 wt % TCA aqueous solution and subjected to reaction for 1.5 h. After the reaction, the resulting reaction mixture was filtered to obtain a filtrate. A molar ratio of lanthanum carbonate to TCA was 1.05:1. The filtrate was placed in a desiccator and dried with phosphorus pentoxide as a desiccant under a vacuum degree of $5.0 \times 10^2$ Pa for 12 h to obtain lanthanum trichloroacetate hydrate.

0.1 mol of lanthanum trichloroacetate hydrate, 0.31 mol of isopropanol and 50 mL of toluene were mixed, and added with 7.25 g of diced sodium, and then heated under reflux at 110° C. for 2 h. The resulting reaction mixture was filtered to obtain a lanthanum isopropoxide solution.

The lanthanum isopropoxide solution was added with 57.19 g of L-phenylalanine, and then heated under reflux at 80° C. for 2 h. After the reaction was completed, the resulting reaction mixture was filtered to obtain a precipitate. The precipitate was vacuum-dried at 50° C. for 24 h to obtain lanthanum L-phenylalanine complex.

Example 2

A polylactic acid composition consisted of the following components: 100 g of polylactic acid, 0.5 g of lanthanum L-phenylalanine complex prepared according to Preparation Example 2, and 0.8 g of epoxidized soybean oil.

Polylactic acid, lanthanum L-phenylalanine, and epoxidized soybean oil were mixed by a twin-screw extruder at 180° C. for 5 min to obtain the polylactic acid composition. A bar test specimen of the polylactic acid composition was obtained by injection molding and subjected to performance testing.

Example 3

This example was the same as Example 1 except that the cerium L-phenylalanine complex was used in an amount of 1.0 g.

Example 4

This example was the same as Example 2 except that the lanthanum L-phenylalanine complex was used in an amount of 1.0 g.

Example 5

This example was the same as Example 1 except that the cerium L-phenylalanine complex was used in an amount of 1.5 g.

Example 6

This example was the same as Example 2 except that the lanthanum L-phenylalanine complex was used in an amount of 1.5 g.

Comparative Example 1

This example was the same as Example 1 except that no rare earth amino acid complex was added.

Preparation Comparative Example 1

This example was the same as Preparation Example 1 except that L-alanine was used as the amino acid. Thus a cerium L-alanine complex was obtained.

Comparative Example 2

This example was the same as Example 1 except that cerium L-alanine complex prepared according to Preparation Comparative Example 1 was used as the rare earth amino acid complex.

TABLE 1

| Item | Example 1 | Example 2 | Example 3 | Example 4 | Example 5 | Example 6 | Comparative Example 1 | Comparative Example 2 | Blank polylactic acid |
|---|---|---|---|---|---|---|---|---|---|
| Vicat softening temperature/° C. | 105.4 | 93.4 | 117.5 | 110.8 | 126.6 | 119.2 | 60 | 82.4 | 60 |

It can be seen from the table that compared with that of Comparative Example 1 and the blank polylactic acid, the Vicat softening temperature of the polylactic acid composition of Examples 1 to 6 is significantly increased. Compared with Comparative Example 2, the rare earth amino acid complex formed by the specific amino acid in the present disclosure is more conducive to improving the Vicat softening temperature of polylactic acid.

The present disclosure is not limited to the above embodiments. Without departing from the essence of the present disclosure, all deformations, improvements, and substitutions conceivable by those skilled in the art shall fall within the scope of the present disclosure.

What is claimed is:

1. A method for increasing a softening temperature of polylactic acid, the method comprising:
    mixing the polylactic acid with a rare earth amino acid complex and an additive to obtain a polylactic acid composition, the polylactic acid composition having a higher softening temperature than that of the polylactic acid, wherein:
    the rare earth amino acid complex is a complex of a rare earth metal ion with an amino acid,
    a rare earth element corresponding to the rare earth metal ion is at least one selected from the group consisting of lanthanum, cerium and samarium, and
    the amino acid is at least one selected from the group consisting of L-phenylalanine, tyrosine and tryptophan.

2. The method of claim 1,
    wherein the rare earth amino acid complex is formed by reacting a rare earth isopropoxide with the amino acid in a molar ratio of 1:(3.5-4.0) in a solvent at a temperature of 70-90° C. for one to two hours to obtain the rare earth amino acid complex, the solvent consisting of an aromatic compound and isopropanol.

3. The method of claim 2, wherein the aromatic compound is one selected from the group consisting of benzene and alkylbenzene.

4. The method of claim 2, wherein the rare earth isopropoxide is formed by:
    reacting a rare earth carbonate with trichloroacetic acid in a molar ratio of (1.05-1.2):1 at a temperature of 0-15° C. to obtain a rare earth trichloroacetate, and
    reacting the rare earth trichloroacetate with isopropanol in a molar ratio of 1:(3-3.5) to obtain the rare earth isopropoxide.

5. The method of claim 4, wherein the rare earth trichloroacetate is reacted with isopropanol to obtain the rare earth isopropoxide in the presence of an alkali metal.

6. The method of claim 5, wherein a molar ratio of isopropanol to the alkali metal is in a range of 1:(1-1.1).

7. The method of claim 5, wherein the alkali metal is sodium.

8. The method of claim 1, wherein the additive is at least one selected from the group consisting of: soybean oil, epoxidized soybean oil, tributyl citrate and acetyl tributyl citrate.

9. The method of claim 1, wherein based on 100 parts by weight of polylactic acid, the rare earth amino acid complex is used in an amount of 0.5-2.0 parts by weight, and the additive is used in an amount of 0.5-2.0 parts by weight.

10. The method of claim 1, wherein the polylactic acid is mixed with the rare earth amino acid complex and the additive in a twin-screw extruder at a temperature of 170-190° C. for 5 to 15 minutes to obtain the polylactic acid composition.

11. A polylactic acid composition, comprising:
    100 parts by weight of polylactic acid,
    0.5-2.0 parts by weight of a rare earth amino acid complex, and
    0.5-2.0 parts by weight of an additive;
    wherein the rare earth amino acid complex is formed by complexing a rare earth metal ion with an amino acid; a rare earth element corresponding to the rare earth metal ion is one or more selected from the group consisting of lanthanum, cerium and samarium; and the amino acid is at least one selected from the group consisting of L-phenylalanine, tyrosine and tryptophan; and
    the additive is one or more selected from the group consisting of soybean oil, epoxidized soybean oil, tributyl citrate and acetyl tributyl citrate.

12. A method for preparing the composition of claim 11, comprising the following steps:
    mixing raw materials comprising the polylactic acid, the rare earth amino acid complex and the additive by a twin-screw extruder at a temperature of 170-190° C. for 5-15 min to obtain the polylactic acid composition.

* * * * *